United States Patent [19]

Yamamoto

[11] 4,152,507

[45] May 1, 1979

[54] PROCESS FOR MODIFYING FIBROUS PRODUCTS CONTAINING CELLULOSIC FIBERS

[75] Inventor: Kazuhide Yamamoto, Uji, Japan

[73] Assignee: Daido-Maruta Finishing Co. Ltd., Kyoto, Japan

[21] Appl. No.: 919,680

[22] Filed: Jun. 27, 1978

Related U.S. Application Data

[62] Division of Ser. No. 725,621, Sep. 22, 1976.

[30] Foreign Application Priority Data

Sep. 30, 1975 [JP] Japan ................................. 117164

[51] Int. Cl.$^2$ ............................................ C08F 224/00
[52] U.S. Cl. ....................................................... 526/273
[58] Field of Search ........................................ 526/273

[56] References Cited

U.S. PATENT DOCUMENTS

| | | | |
|---|---|---|---|
| 3,525,721 | 8/1970 | Jorgensen | 526/273 |
| 3,988,273 | 10/1976 | Tetsuo et al. | 526/273 |
| 3,998,997 | 12/1976 | Mowdood et al. | 526/273 |
| 4,081,383 | 3/1978 | Warburton et al. | 526/273 |

*Primary Examiner*—John Kight, III
*Attorney, Agent, or Firm*—Sherman & Shalloway

[57] ABSTRACT

A process for modifying a fibrous product containing cellulosic fibers which comprises treating said fibrous product with a solution or dispersion containing a particular acrylic copolymer having a glycidyl group and an alkylene oxide sidechain, drying the fibrous product; and heat-treating it in the presence of an acid catalyst at a temperature sufficient to cleave the oxirane linkage of the glycidyl group. This process can impart superior dry and wet crease resistances, shrinkage resistance and wash and wear properties and also soil removing ability, resistance to redeposition, water absorption and water penetrability to fibrous products containing cellulosic fibers while retaining their mechanical strength characteristics.

20 Claims, No Drawings

PROCESS FOR MODIFYING FIBROUS PRODUCTS CONTAINING CELLULOSIC FIBERS

This is a division, of application Ser. No. 725,621, filed Sept. 22, 1976.

This invention relates to a process for modifying fibrous products containing cellulosic fibers, and more particularly, to a novel process for resin finishing fibrous products containing cellulosic fibers, which can impart superior dry and wet crease resistances, shrinkage resistance and wash and wear properties and also superior soil removing ability, resistance to redeposition, water absorption and water penetrability to such fibrous products while retaining their mechanical strength characteristics such as tensile strength, tear strength and flex abrasion strength at high levels and without generating any formaldehyde which may cause dermal troubles.

Fibrous products containing cellulosic fibers have superior physical strength characteristics such as tear strength, flex abrasion strength or tensile strength, but have the defect that when washed, they shrink considerably in the warp and filling directions, and they also have poor dry and wet crease resistances and wash and wear properties.

Various methods have therefore been proposed previously with a view to improving the wash shrinkage resistance, dry crease resistance, wet crease resistance and wash and wear properties of the cellulosic fibrous products, but the only feasible method now in commercial use is an aminoplast resin finishing method which comprises impregnating a cellulosic fiber-containing fibrous product with an N-methylol compound or its functional derivative such as dimethylol glyoxal monoureine in the presence of an acid catalyst, and then heat-treating the fibrous product.

Such a conventional method using an N-methylol compound or its functional derivative can give rise to a considerable improvement in shrinkage resistance and dry and wet crease resistances, but suffers from the serious defect that this resin finishing, on the other hand, results in a marked reduction in physical strengths such as tear strength, flex abrasion strength and tensile strength which the cellulosic fibrous products inherently possess. In addition, according to the above conventional finishing method, formaldehyde is freed during the finishing treatment. The free formaldehyde not only pollutes the environment of the site of finishing operation, but also causes dermal troubles such as irritation, rash and blister and gives off an uncomfortable odor as a result of remaining in the cellulosic fibrous products treated. This has posed a problem of "apparel pollution". In Japan, a legislative control of the formaldehyde content of household goods has already been established from the standpoint of sanitation (Law No. 112 Relating to the Regulation of Household Goods Containing Hazardous Substances), and it is expected that the resin finishing of textile articles with formaldehyde-containing treating agents will also be legislatively prohibited in near future.

Resin finishing of cellulosic fibrous products is essential for saving a trouble of ironing and providing fibrous articles, particulerly wearing apparel, which do not crease for long periods of time.

With this background, the present inventor previously suggested a "formalin-free" resin finishing method which comprises treating fibrous products containing cellulosic fibers with a solution or dispersion of a glycidyl-containing copolymer composed of 99 to 45 mole% of at least one structural unit derived from an acrylic monomer or a methacrylic monomer and 1 to 55 mole% of at least one structural unit derived from glycidyl acrylate or glycidyl methacrylate (Japanese Laid-Open Patent Publication No. 40897/76 to U.S. Pat. application Ser. No. 493,141, filed July 30, 1974).

It has been found that this suggested treating method can improve the dry and wet crease resistances, shrinkage resistance and wash and wear properties of the cellulosic fibrous products without an appreciable reduction in its mechanical strength characteristics, but causes some impairment of the natural characteristics of the cellulosic fibrous products such as oil removal, resistance to redeposition, water absorption and antistatic properties. The inventor also noted that when large quantities of fibrous products are treated by this method, some amount of a water-soluble gum-like substance adheres to mangle rolls and other rolls used up to the drying step, which undesirable phenomenon is referred to in the art as "gum up".

Investigations were further conducted in an attempt to provide a method for modifying cellulosic fibrous products without impairing their natural characteristics. These investigations led to the discovery that the use of a polymer resulting from the introduction of alkylene glycol side chains into the above glycidyl-containing copolymer can obviate the undesirable "gum-up" phenomenon, and afford cellulosic fibrous products having superior soil removing ability, resistance to redeposition, water absorption, hygroscopicity, and water penetration.

Thus, according to the present invention, there is provided a process for modifying a fibrous product containing cellulosic fibers, which comprises treating said fibrous product with a solution or dispersion containing a glycidyl-containing copolymer consisting essentially of (a) 1 to 55 mole% of at least one structural unit of the formula

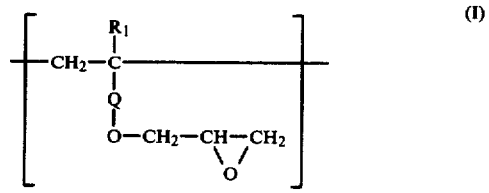

wherein $R_1$ represents a hydrogen atom or a methyl group, and Q is CO or $CH_2$, (b) 0.5 to 25 mole% of at least one structural unit of the formula

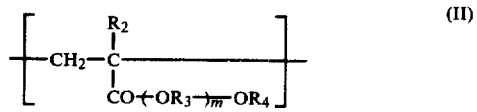

wherein $R_2$ represents a hydrogen atom or a methyl group, $R_3$ represents an alkylene group, $R_4$ represents a hydrogen atom, an alkyl group, an acryloyl group or a methacryloyl group, and m is an integer of at least 1, and (c) 98.5 to 20 mole% of at least one a structural unit of the formula

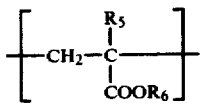

(III)

wherein $R_5$ represents a hydrogen atom or a methyl group and $R_6$ represents an alkyl group or a hydroxyalkyl group;

drying the fibrous product; and then heat-treating it in the presence of an acid catalyst at a temperature sufficient to cleave the oxirane linkage of the glycidyl group.

The glycidyl-containing copolymer used in this invention is a novel film-forming acrylic or methacrylic copolymer which contains both a pendant side chain with a glycidyl group

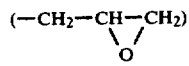

and a side chain with an alkylene glycol residue and can be formed into a solution or dispersion, particularly an emulsion. This copolymer contains (a) 1 to 55 mole%, preferably 5 to 35 mole%, more preferably 10 to 25 mole%, of at least one structural unit of formula (I) containing a glycidyl-containing side chain, (b) 0.5 to 25 mole%, preferably 2 to 20 mole%, more preferably 5 to 15 mole%, of at least one structural unit of formula (II) containing a side chain with an alkylene glycol residue, and (c) 98.5 to 20 mole%, preferably 93 to 45 mole%, more preferably 85 to 60 mole%, of at least one acrylic or methacrylic structural unit.

The structural units of formulae (I), (II) and (III) need not to be present regularly or in blocks in the copolymer molecule, but preferably, they are arranged at random.

When $R_4$ in the structural unit of formula (II) is an acryloyl or methacryloyl group, the glycidyl-containing copolymer sometimes partially forms an intramolecular crosslinkage, but such a copolymer can also be used in the invention.

Desirably, the copolymer consists only of the structural units of formulae (I), (II) and (III), but if desired, it may contain up to 10 mole%, preferably not more than 5 mole%, of another vinyl-type structural unit. The other vinyl-type structural unit is suitably one derived from another copolymerizable vinyl monomer, for example, an ethylenically unsaturated carboxylic acid such as acrylic acid, methacrylic acid, itaconic acid, crotonic acid or maleic acid, an ethylenically unsaturated carboxylic acid amide such as acrylamide, methacrylamide, N,N-dimethyl acrylamide or N,N-diethyl methacrylamide, an unsaturated nitrile such as acrylonitrile, styrene, α-methylstyrene, vinyltoluene, vinyl acetate, and vinyl chloride, the unit derived from itaconic acid, crotonic acid, acrylamide, methacrylamide, or acrylonitrile being especially preferred.

The glycidyl-containing copolymer used in this invention desirably has a glass transition temperature of not more than 50° C., preferably not more than 30° C., more preferably 0° to −70° C. The term "glass transition temperature", as used in the present application denotes the temperature at which a polymer changes from a state of flexible rubber to a state of brittle glass or vice versa, and which is at an inflection point in a Young's modulus-temperature curve or a film of the polymer.

The glycidyl-containing copolymer is composed of a substantially linear film-forming polymeric substance in which the glycidyl group is present as a pendant side chain. The number of the glycidyl groups is generally 17,000 to 250, preferably 5,000 to 400, more preferably 4,000 to 500, in terms of epoxy equivalency.

In the present application, the term "epoxy equivalency" denotes the weight in grams of the copolymer per gram equivalent of epoxy group.

The molecular weight of the glycidyl-containing copolymer is advantageously at least 7,000, preferably at least 30,000, more preferably at least 50,000, as measured by the method to be described below. There is no particular upper limit to the molecular weight so long as the copolymer is film-forming. Any high-molecular-weight glycidyl-copolymers within the definition of the invention which can be maintained in the emulsion state can be used in the invention.

The glycidyl-containing copolymer can be prepared by polymerizing monomers which will provide the structural units of formulae (I), (II) and (III), by various known methods such as emulsion polymerization, solution polymerization, bulk polymerization, or suspension polymerization. The emulsion-polymerization method is preferred because it can afford copolymers having a high molecular weight, and the resulting copolymer emulsion can be directly used as a fiber treating liquor to be described.

The emulsion polymerization can be performed, for example, by mixing a catalyst such as potassium persulfate, an emulsifier such as polyoxyethylene nonyl phenol ether or polyoxyethylene lauryl ether, and the monomers with deionized water with stirring to form an emulsion of the monomeric mixture, and heating a part of the emulsion to a temperature of at least above 50° C. in an inert atmosphere and at the same time, adding the remaining emulsion dropwise to continue the polymerization.

The monomers which will afford the glycidyl-containing structural unit include compounds of the following formula

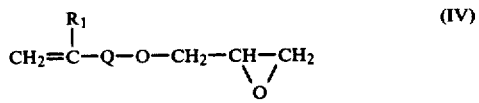

(IV)

wherein $R_1$ and Q are the same as defined above, that is glycidyl acrylate glycidyl methacrylate and allyl glycidyl ether, the glycidyl methacrylate being especially preferred. Thus, a preferred structural unit of formula (I) to be derived from the above glycidyl-containing monomer is expressed by the following formula:

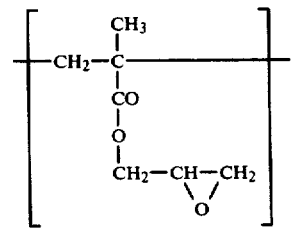

These glycidyl-containing monomers can be used either alone or in combination of two or more.

Preferred monomers which will provide the structural unit of formula (II) containing an alkylene glycol side chain are mono- or di-acrylic or methacrylic esters of alkylene glycols which are expressed by the following formula

 (V)

wherein $R_2$, $R_3$ and $R_4$ are as defined hereinabove.

In formulae (II) and (V), the alkylene group represented by $R_3$ is an alkylene group containing not more than 3 carbon atoms, especially 2 carbon atoms (i.e., ethylene), which may be of straight chain or branched chain. The alkyl group represented by $R_4$ may be of straight chain or branched chain, and preferably has up to 10 carbon atoms, especially up to 5 carbon atoms, for example, methyl, ethyl, n- or iso-propyl, n-, sec- or tert-butanol, and n-, sec- or neo-pentyl, the methyl and ethyl being especially preferred. m in these formulae is an integer of at least 1, preferably 5 to 25, especially 9 to 23. Advantageously, the group $R_4$ is a hydrogen atom.

Examples of the compounds of formula (V) are ethylene glycol diacrylate, diethylene glycol diacrylate, triethylene glycol diacrylate, tetraethylene glycol diacrylate, nonaethylene glycol diacrylate, tetradecaethylene glycol diacrylate, tricosaethylene glycol diacrylate, methoxyethylene glycol monoacrylate, methoxydiethylene glycol monoacrylate, methoxytriethylene glycol monoacrylate, methoxytetraethylene glycol monoacrylate, methoxynonaethylene glycol monoacrylate, methoxytetradecaethylene glycol monoacrylate, methoxytricosaethylene glycol monoacrylate, ethoxyethylene glycol monoacrylate, propoxydiethylene glycol monoacrylate, propylene glycol diacrylate, and methoxy propylene glycol monoacrylate, and the corresponding di- or monomethacrylates. These acrylates or methacrylates can be used either alone or in admixture of two or more.

Especially preferred structural units of formula (II) which are provided by the monomers of formula (V) are represented by the following formula

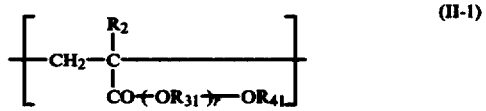 (II-1)

wherein $R_2$ represents a hydrogen atom or a methyl group, $R_{31}$ represents an alkylene group containing not more than 3 carbon atoms, $R_{41}$ represents an alkyl group containing not more than 10 carbon atoms, especially not more than 5 carbon atoms, and r is a number of 5 to 25, especially 9 to 23.

The monomer which will give the structural unit of formula (III) may preferably be an acrylic acid ester or a methacrylic acid ester represented by the following formula

 (VI)

wherein $R_5$ and $R_6$ are the same as defined hereinabove.

In the formula (VI), the alkyl group represented by $R_6$ may be of straight chain or branched chain, and preferably contains up to 18 carbon atoms, especially 1 to 9 carbon atoms, such as methyl, ethyl, propyl, butyl, heptyl, hexyl, octyl, 2-ethylhexyl, decyl, dodecyl, pentadecyl, and octadecyl. The hydroxyalkyl group represented by $R_6$ contains up to 6 carbon atoms, especially 2 to 4 carbon atoms, such as hydroxyethyl, hydroxypropyl, and hydroxybutyl. Alkyl groups are especially suitable as $R_6$.

Examples of the compounds of formula (VI) include methyl acrylate, ethyl acrylate, isopropyl acrylate, butyl acrylate, octyl acrylate, 2-ethylhexyl acrylate, lauryl acrylate, methyl methacrylate, ethyl methacrylate, propyl methacrylate, butyl methacrylate, 2-ethylhexyl methacrylate, 2-hydroxyethyl acrylate, hydroxyethyl methacrylate, tridecyl methacrylate, stearyl methacrylate, and cyclohexyl methacrylate.

These compounds of formula (VI) can be used either alone or in combination of two or more.

Thus, suitable structural units of formula (III) derived from the monomers of formula (VI) are represented by the following formula

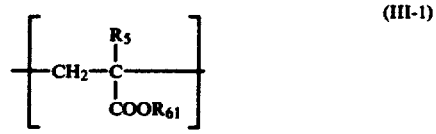 (III-1)

wherein $R_5$ represents a hydrogen atom or a methyl group, and $R_{61}$ represents an alkyl group containing up to 18 carbon atoms, especially 1 to 9 carbon atoms, or a hydroxyalkyl group containing up to 6 carbon atoms, especially 2 to 4 carbon atoms.

According to the process of this invention, the desired effect can be fully achieved by treating cellulosic fibrous products with the glycidyl-containing copolymer alone. It has been found however that the use of an imidazolidinone derivative of the following formula

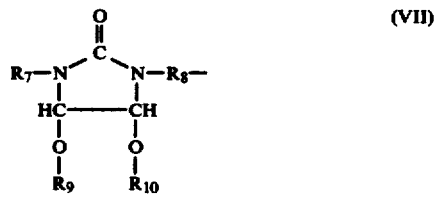 (VII)

wherein $R_7$ and $R_8$, independently from each other, represent a hydrogen atom, an alkyl group or a hydroxyalkyl group, and $R_9$ and $R_{10}$, independently from each other, represent a hydrogen atom, an alkyl group, or an acyl group, together with the glycidyl-containing copolymer can afford cellulosic fibrous products having further enhanced dry and wet crease resistances, shrinkage resistance, wash and wear properties, soil removing ability, resistance to redeposition, water absorption, and water penetration.

In the formula (VII), the alkyl groups represented by $R_7$, $R_8$, $R_9$ and $R_{10}$ may be of straight chain or branched chain, and include, for example, methyl, ethyl, n- or isopropyl, n-, iso-, sec- or tert-butyl, n- or neo-pentyl, and n-hexyl. Preferably, they are lower alkyl groups with 1 to 5 carbon atoms. The alkyl group represented by $R_7$ or $R_8$ is preferably a methyl group. The alkyl group represented by $R_9$ or $R_{10}$ is preferably an isopropyl group. Alkyl groups represented by $R_7$ and $R_8$ which are substituted with a hydroxyl, cyano, carboxyl, lower alkoxycarbonyl, or carbamoyl group preferably contain 1 to 5 carbon atoms, such as hydroxymethyl, 1- or 2-hydroxyethyl, 1-, 2-, or 3-hydroxypropyl, 4-hydroxybutyl, 2-cyanoethyl, 2-carboxyethyl, 2-ethoxycarbonylethyl, and 2-carbamoylethyl. In particular, hydroxyalkyl groups containing 1 to 5 carbon atoms are preferred.

With the imidazolidinone derivative of formula (VII) in which $R_7$ and/or $R_8$ represents a hydroxymethyl group, formaldehyde is likely to be freed from the N-methylol group. Accordingly, where a "formalin-free" treatment is intended, the use of such imidazolidinone derivatives should desirably be avoided. However, when the imidazolidinone derivative is used together with the glycidyl-group containing copolymer in accordance with the present invention, its amount can be drastically reduced. Thus it is noteworthy that even when imidazolidinone derivatives of formula (VII) in which $R_7$ and/or $R_8$ represents a hydroxmethyl group are used, the amount of free formaldehyde generated can be markedly decreased compared with the conventional processes.

In a "formalin-free" treatment, the use of an imidazolidinone derivative of formula (VII) in which $R_7$ and/or $R_8$ represents a hydroxyethyl group is recommendable.

The acyl group represented by $R_9$ or $R_{10}$ denotes a carboxylic acid residue of the formula $R_{11}CO$—wherein $R_{11}$ represents an alkyl or aralkyl group, such as acetyl, propionyl, or phenylacetyl. Alkanoyl groups containing 1 to 5 carbon atoms, especially acetyl, are preferred.

Imidazolidinone derivatives that can be conveniently used in the present invention are compounds of the following formula

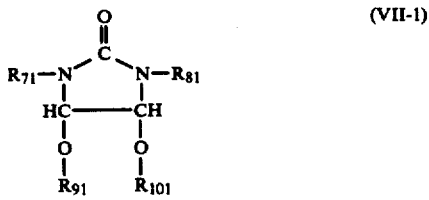

(VII-1)

wherein $R_{71}$ and $R_{81}$, independently from each other, represent a hydrogen atom, an alkyl group containing 1 to 5 carbon atoms, or a hydroxyalkyl group containing 1 to 5 carbon atoms, and $R_{91}$ and $R_{101}$, independently from each other, represent a hydrogen atom, an alkyl group containing 1 to 5 carbon atoms, or an alkanoyl group containing 1 to 5 carbon atoms.

Examples of suitable imidazolidinone derivatives of formula (VII) or (VII-1) are 4,5-dihydroxy-2-imidazolidinone, 1,3-dimethyl-4,5-dihydroxy-2-imidazolidinone, 1,3-diethyl-4,5-dihydroxy-2-imidazolidinone, 1,3-n-propyl-4,5-dihydroxy-2-imidazolidinone, 1,3-di(α-hydroxyethyl)-4,5-dihydroxy-2-imidazolidinone, 1,3-di(β-hydroxyethyl)-4,5-dihydroxy-2-imidazolidinone, 1,3-dimethyl-4,5-dimethoxy-2-imidazolidinone, 1,3-dimethyl-4,5-diethoxy-2-imidazolidinone, 1,3-dimethyl-4,5-diisopropoxy-2-imidazolidinone, 1,3-dimethyl-4,5-diacetoxy-2-imidazolidinone, 1,3-di-(β-cyanoethyl)-4,5-dihydroxy-2-imidazolidinone, 1,3-di-(β-cyanoethyl)-4,5-dimethoxy-2-imidazolidinone, 1,3-di-(β-carbamoylethyl)-4,5-dihydroxy-2-imidazolidinone, 1,3-di-(β-carbamoylethyl)-4,5-dimethoxy-2-imidazolidinone, 1,3-di-(β-carboxyethyl)-4,5-dihydroxy-2-imidazolidinone, 1,3-di-(β-carboxyethyl)-4,5-dimethoxy-2-imidazolidinone, 1,3-di-(β-ethoxycarbonylethyl)- 4,5-dihydroxy-2-imidazolidinone, and 1,3-di-(β-ethoxycarbonylethyl)-4,5-dimethoxy-2-imidazolidinone.

Of these, 4,5-dihydroxy-2-imidazolidinone, 1,3-dimethyl-4,5-dihydroxy-2-imidazolidinone, 1,3-dimethyl-4,5-diacetoxy-2-imidazolidinone, 1,3-dimethyl-4,5-diisopropoxy-2-imidazolidinone and 1 3-di-(3-hydroxyethyl)-4,5-dihydroxy-2-imidazolidinone are especially preferred for use in this invention.

When cellulosic fibrous products are treated by the process of this invention using the glycidyl-containing copolymer with or without the imidazolidinone derivative, these treating compounds can be applied to the cellulosic fibrous products generally as a solution or dispersion in a liquid medium. When both the copolymer and the imidazolidinone derivative are used in combination, it is advantageous to prepare a solution or dispersion which contains both of these compounds at the same time. If desired, however, the two components are separately formed into separate solutions or dispersions, and they are applied to the cellulosic fibrous products successively. In the following, a further description of the invention is given with regard to a solution or dispersion containing both of these components, but it should be understood that the scope of the invention is not limited to this embodiment.

With increasing molecular weight, the glycidyl-containing copolymer becomes more difficult to dissolve completely in solvents. Accordingly, copolymers having a relatively low molecular weight of, say, 10,000 to 35,000, can be used as solutions in a solvent such as tetrahydrofuran, methyl isobutyl ketone, or dimethyl formamide. Generally, however, it is advantageous to use them in the form of dispersions.

Water is most suitable as the solvent or dispersion medium, but organic solvents, for example, alcohols such as methanol, ethanol or isopropanol, ketones such as acetone, methyl ethyl ketone or methyl isobutyl ketone, amides such as dimethyl formamide or formamide, and ethers such as dioxane or tetrahydrofuran, and mixtures of water and water-miscible organic solvents can also be used.

In order to maintain the copolymerstable in the dispersion medium, an emulsifier can be used. Examples of the emulsifier are nonionic, anionic or cationic surface active agents, for example, sulfate ester alkali metal salts or quaternary ammonium salts of polyoxyalkylene alkyl ethers, polyoxyalkylene alkyl phenol ethers, and polyoxyalkylene alkyl ethers.

Where the copolymer is synthesized by the emulsion polymerization process, the emulsion polymerization product can be used after dilution without separating the copolymer from it.

The imidazolidinone derivatives are generally soluble in water or organic solvents such as methanol or ethanol, and can usually be applied in the form of solution.

Water is most suitable as the liquid medium for the solution or dispersion, but a mixture of water and a water-miscible organic solvent such as dioxane, diethylene glycol diethyl ether, dimethyl formamide, dimethyl sulfoxide, methanol, ethanol, acetone, and methyl ethyl ketone can also be used.

The concentrations of the glycidyl-containing copolymer and the imidazolidinone derivative in the treating solution or dispersion can be varied over a wide range according, for example, to the types of the copolymer and the imidazolidinone derivative, the type or shape of the fibrous product to be treated, and the treating conditions. Generally, the copolymer can be used in a concentration of 0.1 to 70% by weight, preferably 1 to 50% by weight, based on the weight of the solution or dispersion. More specifically, the concentration of the copolymer is 0.5 to 10% by weight, especially 1 to 5% by weight, for treating woven or knitted goods, and 5 to 70% by weight, preferably 10 to 50% by weight, for treating non-woven fabrics.

The suitable concentration of the imidazolidinone derivative to be used in combination with the copolymer is 1 to 30% by weight, preferably 5 to 20% by weight, more preferably 7 to 15% by weight, based on the weight of the solution or dispersion containing it.

According to the treating process of the invention, the heat-treating step is generally carried out in the presence of an acid catalyst in order to promote the cleavage of the oxirane ring of the glycidyl-containing copolymer, a cross-linking reaction of the glycidyl-containing copolymer or between the glycidyl-containing copolymer and the hydroxyl groups of cellulosic fibers, a crosslinking reaction between the imidazolidinone derivative and the hydroxyl groups of cellulosic fibers, and a reaction between the imidazolidinone derivative and the glycidyl-containing copolymer.

Preferably, the acid catalyst can be incorporated in the solution or dispersion. If desired, prior to the heat-treating step, the acid catalyst is applied in the form of solution or dispersion to cellulosic fibrous products separately from the solution or dispersion containing the glycidyl-containing copolymer before or after the drying step.

Useful acid catalysts are those which are frequently used in the resin finishing of cellulosic fibrous products, such as magnesium chloride, zinc chloride, aluminum chloride, aluminum hydroxy chloride, zinc nitrate, magnesium nitrate, magnesium biphosphate, ammonium phosphate, zinc borofluoride, magnesium borofluoride, ammonium chloride, ammonium nitrate, monoethanolamine hydrochloride, diethanolamine hydrochloride, acetic acid, trichloroacetic acid, and zinc stearate. Of these chlorides, borofluorides, nitrates, sulfates, phosphates or biphosphates of metals, particularly metal chlorides, metal borofluorides or metal nitrates, are preferred. Suitable metal are zinc, magnesium and aluminum. These acid catalysts can be used either alone or in admixture of two or more.

The amount of the acid catalyst is not critical, and generally may be a catalytic amount. For example, the catalyst can be used in an amount of about 0.05 to 30% by weight, preferably 0.5 to 10% by weight, based on the weight of the treating solution or dispersion.

The present inventor also found that a fluorocarboxylic acid of the following formula $$C_nF_pH_qCOOH \qquad (VIII)$$

wherein n is an integrer of 1 to 5, p is 2 to 10, and q is 0 or 1, with the proviso that the sum of p and q equals $2n+1$, is very suitable as the acid catalyst used in the process of the present invention, and that the use of this fluorocarboxylic acid can remove the defects associated with the use of aforesaid acid catalysts, for example, the generation of offensive or irritating odors, and the reduction of the strength of the fibrous product.

Suitable fluorocarboxylic acids that can be used in the invention are $CF_3COOH$, $CF_2HOOOH$, $C_2F_5COOH$, $C_2F_4HCOOH$, $C_3F_7COOH$, $C_3F_6HCOOH$, $C_4F_9COOH$, $C_4F_8HCOOH$, $C_5F_{11}COOH$, and $C_5F_{10}HCOOH$. Of these, trifluoroacetic acid is especially preferred. These fluorocarboxylic acids can be used either alone or in admixture of two or more. They may also be used in conjunction with the aforesaid acid catalysts such as zinc borofluoride, magnesium chloride, magnesium nitrate, magnesium borofluoride, zinc chloride, and zinc nitrate.

The amount of the fluorocarboxylic acid of formula (VIII) is not critical, but can be varied over a wide range according, for example, to the type or concentration of the glycidyl-containing copolymer, the type of the fibrous product to be treated, and the treating conditions. Generally, the amount is 0.01 to 1.5% by weight, preferably 0.05 to 0.5% by weight, based on the weight of the treating solution or dispersion, and 0.05 to 15% by weight, preferably 0.1 to 10% by weight, based on the copolymer used.

The pH of the treating solution or dispersion is generally preferably not more than 7, usually 1.0 to 6.5, preferably 1.5 to 5, more preferably 3 to 4.5. The pH adjustment of the treating liquor can be performed by adding a pH adjuster and/or a buffer solution to it. Examples of such pH adjusters or buffer solutions are described, for example, in a Japanese-language publication "Manual of Chemistry", pages 1096 to 1099, 1958, edited by the Japanese Chemical Society and published by Maruzen Co., Ltd.

If desired, the treating liquor in accordance with the present invention may include conventional textile finishes such as softeners, water repellents, oil repellents, penetrants, bath stabilizers, and hand improvers.

The resulting solution or dispersion can be applied to cellulosic fibrous products by any desired conventional methods such as dipping, padding, spraying, or coating.

The pickup of the solution or dispersion in the cellulosic fibrous product can be varied freely over a wide range according, for example, to the concentration of the treating liquor, and the type and form of the fibrous product. Generally, it is advantageous that the pickup of the treating liquor becomes 30 to 300%, preferably 50 to 150%.

In the present application, the "pickup" is a value calculated in accordance with the following equation.

Pickup (%) = A-B/B × 100 wherein A is the weight in grams of a cellulosic fibrous product after being treated with a treating liquor, and B is the weight in grams of the dry cellulosic fibrous product before treatment with the treating liquor.

The fibrous product to which the treating liquor has been applied is then pre-dried to remove the solvent or dispersion medium, and then treated at a temperature sufficient to cleave the oxirane linkage of the glycidyl-containing copolymer. The pre-drying and heat-treatment can be performed by the same operating methods as in the conventional resin finishing.

The pre-drying is performed at a temperature of 80° to 120° C. until substantially all solvent or dispersion medium is removed (that is, until it is substantially dried). The pre-drying can be performed separately from the heat-treating step to be described hereinafter or as a step successively followed by the heat-treatment.

The heat-treating conditions can be changed over a wide range according, for example, to the type of the glycidyl-containing copolymer, the use or non-use of the imidazolidinone derivative, the use or non-use of catalyst, the type of the catalyst, and the type of the fibrous product to be treated. It is necessary to employ a combination of time and temperature which is sufficient to cleave at least a part, preferably a substantial portion, of the oxirane linkage of the glycidyl group.

The heat-treating temperature can be at least 120° C., and the upper limit is the highest point of temperatures at which the fibrous product is not deteriorated by heat, usually 190° C. Generally, temperatures in the range of 130° to 180° C. are advantageous.

The heat-treatment time is affected by the heat-treating temperature. Generally, the time is short at high temperatures, and long at low temperature. Periods of 0.5 to 15 minutes are generally sufficient.

The fibrous products so heat-treated can be used in various applications, or subjected to ordinary treatments of fibrous products, for example, treatments with a softener, a water- or oil-repellent agent, or a hand improver.

The cellulosic fibrous products that can be treated by the method of the invention include not only fibrous products made of natural fibers such as cotton or flax, regenerated cellulosic fibers such as rayons, polynosic fibers, cellulose ester-type fibers, and cellulose ether-type fibers but also mixed yarns, interknitted fibrous products and non-woven webs of natural or regenerated celulose fibers and various synthetic fibers such as polyester, polyamide, acrylic, vinyl, and benzoate fibers.

The "fibrous product" means not only knitted and woven products, but also yarns and non-woven webs.

The term "fibrous products containing cellulosic fibers", or "cellulosic fibrous products" is used to mean all of the above-mentioned products.

The process of this invention thus affords cellulosic fibrous products having markedly improved shrinkage resistance, dry and wet crease resistances and wash and wear properties, while retaining far superior physical strength characteristics such as tear strength, tensile strength and flex abrasion strength to fibrous products resin-finished with N-methylol compounds by conventional methods.

Furthermore, the treating process of the invention can afford cellulosic fibrous products having more improved soil removing ability, resistance to redeposition, water absorption, water penetrability, and antistatic properties.

Since the process of the invention does not generally use a compound which frees formaldehyde that damages ordinary cellulosic fibers, there is no likelihoold of apparel pollution such as the pollution of the working environment or dermal disorders.

These advantages render the process of the invention commercially very useful.

The process of this invention is further described by the following Examples.

Since the copolymers shown in the following Examples were not soluble in ordinary solvents, their molecular weights were determined by the following method. Using a chain transfer agent, a model copolymer of a low molecular weight was prepared from a monomeric mixture in the same molar ratio. The molecular weight of the resulting copolymer was measured by gel permeation chromatography(using poly methyl methacrylate of a known molecular weight as a reference). Then, the molecular weight of the copolymer actually obtained in each of the following Examples was determined by the extrapolation method.

Whether the glycidyl group was maintained undecomposed in the copolymer was confirmed by an oxirane oxygen analyzing method. In all of the copolymers used in the following Examples, the glycidyl group was retained in a proportion of more than 90% of theory.

(1) Shrinkage of washing

Measured on accordance with JIS L-1042 F-1 in the case of knitted fubrics, and in accordance with JIS L-1042 D in the case of woven fabrics.

(2) Dry crease

Determined by the Monsanto method following JIS L-1041-1960.

(3) Wet crease

A sample is immersed in an aqueous solution containing 0.2% of a nonionic surface active agent at a temperature of 40° C. for 15 minutes, and the excess of the aqueous solution is removed lightly using a filter paper. Then, the wet crease is measured by the above-mentioned Monsanto method.

(4) Tensile strength

Measured in accordance with the strip method in JIS L-1004. In the case of a knitted fabric, the sample is 2.5 cm wise and 10 cm long.

(5) Tear strength

Measured in accordance with the pendulum method in JIS L-1004.

(6) Flex abrasion strength

Measured by the universal type method in JIS L-1004, 1005.

(7) Surface wear

Measured in accordance with the universal type method in JIS L-1004, 1005 using an emery paper (No. 800) and a pressing load of 2 pounds.

(8) Wash and wear property

Measured in accordance with the method of AATCC-88A-94T-III C-2.

(9) Amount of formaldehyde

Measured in accordance with the acetylacetone method described in Japanese Ministry of Welfare and Health Ordinance No. 34 based on Japanese Law No. 112.

(10) Redeposition test (Aquadag method)

100 ml of a soiling aqueous solution containing 0.1 g/liter of Aquadage (trademark for a product of Imperial Chemical Industries, Ltd., which contains as a main ingredient colloidal graphite in solids content of 22%) and 1 g/liter of a detergent (New Beads, a product of Kao Soap Co., Ltd.) is placed in a vessel, and 2 g of a white test sample is put into it. It is automatically rotated in a launderometer at 50° C. for 20 minutes, and washed with warm water and cold water and air dried. Then, the soil deposition on the white fabric treated is observed visually.

(11) Test for soil removing ability

Two drops each of an oily soiling source (machine oil) and a water soiling source (sauce) are dropped onto a white cloth by means of a squirt, and after a while, the cloth is lightly squeezed by a filter paper. It is dried by suspending it indoors for 15 to 30 minutes. Then, it is washed once by a home washer of the automatic reversing type (detergent: 0.1% New Beads, a product of Kao Soap Co., Ltd., temperature: 40±2° C., time: 10 minutes, the goods-to-liquor ratio: 1/50), rinsed, and air dried. The degree of soil removal is observed.

(12) Water penetrability.

One drop (a fixed amount) of distilled water is dropped on a treated woven fabric by means of a burette, and the time required until it absorbs water completely is measured and expressed in seconds.

(13) Water absorption

A treated textile sample is immersed in water for 24 hours, and centrifuged by a centrifugal machine for 10 minutes at a speed of 3,000 rpm. The sample is taken out, and its weight measured. The increase in weight over a completely dried sample is expressed as water absorption (%).

(14) Hygroscopicity (Moisture absorption)

A treated textile sample is dried in a vacuum drier at 50° C. for 24 hours, and then its weight is measured. Then, it is allowed to stand for 7 days in a desiccator kept at a temperature of 20° C. and a relative humidity of 65%. The weight of the sample which has thus absorbed moisture is measured. The weight increase (%) is calculated from the weight of the dry sample and the moisture-absorbed sample.

EXAMPLE 1

A 40-count cotton poplin woven fabric was dipped in each of the following treating liquors I to VIII, withdrawn from the bath, squeezed to a pickup of 70% based on the weight of the fabric, pre-dried at 120° C. for 3.5 minutes, and heat-treated at 155° C. for 3 minutes.

| Treating liquor I (invention) | |
|---|---|
| Emulsion of copolymer A (solids content about 50%) | 7% by weight |
| Acid catalyst (main ingredient, zinc borofluoride; ACCELERATOR X-90, trademark for a product of Sumitomo Chemical Co., Ltd.) | 1% by weight |
| Polyethylene emulsion (MEIKATES PEN, a trademark for a product of Meisei Kagaku Kabushiki Kaisha) | 2% by weight |
| Water | remainder |
| Treating liquor II (invention) | |
| Emulsion of copolymer A (solids content about 50%) | 7% by weight |
| Acid catalyst (a 12.5% aqueous solution of trifluoroacetic acid) | 2% by weight |
| Polyethylene emulsion (MEIKATEX PEN, a product of Meisei Kagaku Kabushiki Kaisha) | 2% by weight |
| Water | remainder |
| Treating liquor III (comparison 1) | |
| Emulsion of copolymer B (solids content about 50%) | 7% by weight |
| Acid catalyst (main ingredient: zinc borofluoride; ACCELERATOR X-90, a product of Sumitomo Chemical Co., Ltd.) | 1% by weight |
| Polyethylene emulsion (MEIKATEX PEN, a product of Meisei Kagaku Kabushiki Kaisha) | 2% by weight |
| Water | remainder |
| Treating liquor IV (invention) | |
| 1,3-Dimethyl-4,5-dihydroxy-2-imidazolidinone (50% aqueous solution) | 20% by weight |
| Acid catalyst (main ingredient: zinc borofluoride; ACCELERATOR X-90, a product of Sumitomo Chemical Co., Ltd.) | 2.5% by weight |
| Emulsion of copolymer A (solids content about 50%) | 5% by weight |
| Polyethylene emulsion (MEIKATEX PEN, a product of Meisei Kagaku Kabushiki Kaisha) | 2% by weight |
| Water | remainder |
| Treating liquor V (invention) | |
| 1,3-Dimethyl-4,5-dihydroxy-2-imidazolidinone (50% aqueous solution) | 20% by weight |
| Acid catalyst (a 12.5% aqueous solution of trifluoroacetic acid) | 2.5% by weight |
| Emulsion of copolymer A (solids content about 50%) | 5% by weight |
| Polyethylene emulsion (MEIKATEX PEN, a product of Meisei Kagaku Kabushiki Kaisha) | 2% by weight |
| Water | remainder |
| Treating liquor VI (comparison 2) | |
| 1,3-Dimethyl-4,5-dihydroxy-2-imidazolidinone (50% aqueous solution) | 20% by weight |
| Acid catalyst (main ingredient: zinc borofluoride; ACCELERATOR X-90, a product of Sumitomo Chemical Co., Ltd.) | 2.5% by weight |
| Emulsion of copolymer B (solids content about 50%) | 5% by weight |
| Polyethylene emulsion (MEIKATEX PEN a product of Meisei Kagaku Kabushiki Kaisha) | 2% by weight |
| Water | remainder |
| Treating liquor VII (comparison 3) | |
| 1,3-Dimethyl-4,5-dihydroxy-2-imidazolidinone (50% aqueous solution) | 20% by weight |
| Acid catalyst (main ingredient: zinc borofluoride; ACCELERATOR X-90 a product of Sumitomo Chemical Co., Ltd.) | 2% by weight |
| Polyethylene emulsion (MEIKATEX PEN, a product of Meisei Kagaku Kabushiki Kaisha) | 2% by weight |
| Water | remainder |
| Treating liquor VIII (comparison 4) | |
| Partially methoxy-substituted methylol-4,5-dihydroxy-ethyleneurea (SUMITEX RESIN NS-11, a trademark for a product of Sumitomo Chemical Co., Ltd.) | 5% by weight |
| Acid catalyst (main ingredient: magnesium chloride; ACCELERATOR MX, a trademark for a product of Sumitomo Chemical Co., Ltd.) | 1.5% by weight |
| Polyethylene emulsion (MEIKATEX PEN, a trademark for a product of Meisei Kagaku Kabushiki Kaisha) | 2% by weight |
| Water | remainder |

The dry and wet creases, wash and wear properties, tensile strength, soil removing ability, resistance to redeposition, water absorption and residual formaldehyde amount of the fabric treated were measured, and the result are shown in Table 1.

The emulsion of copolymer A used in preparing the treating liquors I, II, IV and V was produced by the following procedure using the following recipe A.

| Recipe A | | |
|---|---|---|
| Glycidyl methacrylate | 5 | parts by weight |
| Tetradecaethylene glycol dimethacrylate | 15 | |
| 2-Ethylhexyl acrylate | 25 | |
| Polyethylenealkyl phenol ether (NONION NS-230, a trademark for a product of Nippon Oils and Fats Co., Ltd.) | 1.5 | |
| Polyoxyethylene alkyl phenol ether (EMULSIT 9, a trademark for a product of Daiichi Kogyo Seiyaku Kabushiki Kaisha) | 1.5 | |
| Polyethylene glycol lauryl ether (NOIGEN YX-500, a trademark for a product of Daiichi Kogyo Seiyaku Kabushiki Kaisha) | 1.5 | |
| Polyoxyethylene lauryl ether sulfuric acid ester, sodium salt (TRAX K-300, a trademark for a product of Nippon Oils and Fats Co., Ltd.) | 1.0 | |
| Potassium persulfate | 0.1 | |
| Deionized water | 49.4 | |

Potassium persulfate (0.2 part), 3 parts of polyethylene alkyl phenol ether, 3 parts of polyoxyethylene alkyl phenol ether, 3 parts of polyethylene glycol lauryl ether and 2 parts of polyoxyethylene lauryl ether sulfate, sodium salt were dissolved in 49.4 parts of deionized water, and with stirring, a mixture consisting of 50 parts of 2-ethylhexyl acrylate, 10 parts of glycidyl methacrylate and 30 parts of tetradecaethylene glycol dimethacrylate was added dropwise over the course of 20 to 30 minutes to form a monomer emulsion. One-third of this monomer emulsion was taken out, and mixed with 49.4 parts of deionized water. The mixture was fed into a reaction vessel, and while introducing nitrogen gas, heated with stirring. The polymerization of the mixture was started at 80° C. In 10 minutes after the initiation of polymerization, the remainder (2/3) of the monomer emulsion was added dropwise gradually over the course of about 1 hour. After the addition, the mixture was reacted at 80° to 85° C. for an additional 3 hours to complete the polymerization. The resulting copolymer was an emulsion having a solids content of about 50% with a polymerization conversion of 99.8%.

The copolymer had the following properties.

| | |
|---|---|
| Glycidyl methacrylate unit: | 18.5 mole % |
| 2-Ethylhexyl acrylate unit: | 71.3 mole % |
| Tetradecaethylene glycol dimethacrylate unit: | 10.2 mole % |
| Amount of oxirane oxygen in the emulsion: | |
| Found: | 0.535% |
| Calculated: | 0.563% |
| Epoxy equivalency: | 1346 |
| Average molecular weight: 10,000 to 30,000 | |
| Glass transition temperature (Tg): about −45° C. | |

The emulsion of copolymer B used to prepared the Treating Liquors III and VI was produced in the same way as in the preparation of the emulsion of copolymer A except that the following recipe B was used.

| Recipe B | | |
|---|---|---|
| 2-Ethylhexyl acrylate | 35 | parts by weight |
| Glycidyl methacrylate | 10 | parts by weight |
| Polyoxyethylene alkyl phenol ether (NONION NS-230, a product of Nippon Oils and Fats Co., Ltd.) | 1.7 | parts by weight |
| Polyoxyethylene alkyl phenol ether (EMULSIT 9, a product of Daiichi Kogyo Seiyaku Kabushiki Kaisha) | 1.7 | parts by weight |
| Polyethylene glycol lauryl ether (NOIGEN YX-500, a product of Daiichi Kogyo Seiyaku Kabushiki Kaisha | 1.7 | parts by weight |
| Potassium persulfate | 0.1 | parts by weight |
| Deionized wate | 49.8 | parts by weight |

The resulting copolymer had the following properties.

| | |
|---|---|
| Glycidyl methacrylate unit: | 27 mole % |
| 2-Ethylhexyl acrylate unit: | 73 mole % |
| Amount of oxirane oxygen in the emulsion: | |
| Found: | 1.06% |
| Calculated: | 1.12% |
| Epoxy equivalency: | 679 |
| Average molecular weight: about 50,000 to 100,000 | |
| Glass transition temperature: about −51° C. | |

Table 1

| Properties Treating liquor | Crease resistance (warp + filling) Dry | Crease resistance (warp + filling) Wet | Tensile Strength (kg/5 cm) (filling) | Wash and wear (grade) | Water absorption (%) | Moisture absorption (%) |
|---|---|---|---|---|---|---|
| Untreated | 165 | 163 | 31.5 | 1–1.5 | 34.8 | 6.75 |
| I (Invention) | 236 | 230 | 27.5 | 3 | 33.9 | 7.29 |
| II (Invention) | 244 | 232 | 28.7 | 3 | 34.0 | 7.31 |
| III (Comparison 1) | 231 | 230 | 27.3 | 2.5–3 | 28.8 | 5.97 |
| IV (Invention) | 278 | 269 | 23.4 | 4–4.5 | 32.0 | 6.82 |
| V (Invention) | 285 | 276 | 24.6 | 4.5–5 | 32.7 | 6.84 |
| VI (Comparison 2) | 267 | 254 | 23.0 | 3.5–4 | 27.5 | 5.35 |
| VII (Comparison 3) | 237 | 212 | 19.8 | 2.5–3 | 25.3 | 5.33 |
| VIII (Comparison 4) | 245 | 214 | 18.1 | 3 | 23.5 | 5.10 |

| Properties Treating liquor | Redeposition Soil removal (Aquadag method) | Amount of residual Oily soil | Amount of residual Aqueous soil | formaldehyde (ppm) |
|---|---|---|---|---|

Table 1-continued

| | | | | |
|---|---|---|---|---|
| Untreated | Some soil remained as spots | Soil removed considerably | Soil considerably remained | Not detected |
| I (Invention) | Soil hardly observed | A slightly more soil remained than the untreated | Soil almost completely removed | Not detected |
| II (Invention) | Soil hardly observed | A slightly more soil remained than the untreated | Soil almost completely removed | Not detected |
| III (Comparison 1) | More spot-like soil than the untreated | No soil removed | Soil almost completely removed | Not detected |
| IV (Invention) | Soil hardly observed | A slightly more soil remained than the untreated | Soil almost completely removed | Not detected |
| V (Invention) | Soil hardly observed | A slightly more soil remained than the untreated | Soil almost completely removed | Not detected |
| VI (Comparison 2) | More stop-like soil than the untreated | No soil removed | Soil almost completely removed | Not detected |
| VII (comparison 3) | Some spot-like soil remained | Soil considerably removed | Some soil remained | Not detected |
| VIII (Comparison 4) | Some spot-like soil remained | Some soil remained | Some soil remained | 358 |

From the data given in Table 1, the following conclusion can be drawn. The fabrics treated with treating liquors I and II in accordance with the invention had better water absorption and moisture absorption than those treated with treating liquor III (Comparison 1), and showed markedly improved resistance to redeposition and ability to remove oily soil over the latter. The fabric treated with treating liquor II using the catalyst (trifluoroacetic acid) in accordance with this invention had better dry and wet crease resistances and strength retention than that treated with treating liquor I.

In the case of using treating liquors IV, V and VI which contained both the copolymer emulsion and the imidazolidinone derivative, the following comparison can be made. The fabrics treated with treating liquors IV and V in accordance with the process of this invention had better water absorption and moisture absorption than that treated with treating liquor VI (comparison 2), and showed markedly improved resistance to redeposition and ability to remove oil soil over the latter. The fabric treated with treating liquor V using the catalyst (trifluoroacetic acid) in accordance with the process of the invention showed further improvement in dry and wet crease resistances and strength retention over that treated with treating liquor IV in accordance with the process of the invention.

When treating liquor VII (using the imidazolinone derivative alone) and treating liquor VIII (using the N-methylol compound) were used, the balance between crease resistance and strength in the treated fabrics was poor. In particular, in the case of comparison 4, formaldehyde detected amounted to 358 ppm.

EXAMPLE 2

A 40-count cotton poplin woven fabric was treated by the same procedure as in Example 1 except that treating liquors obtained in accordance with the same recipe at treating liquor IV in Example 1 except that each of the copolymer emulsions C-1 to C-10 shown in Table 2 was used instead of the emulsion of copolymer A. The copolymer emulsions C-1 to C-10 (solids content about 50%) were each prepared in the same way as in Example 1 (the adjustment of the average molecular weight was performed by varying the amount of lauryl mercaptan added). The properties of the treated fabrics are also shown in Table 2.

Table 2

| Copolymer emulsion | Average molecular weight ($\times 10^4$) | Glycidyl methacrylate unit (mole %) | Methoxy-tricosa-ethylene glycol monomethacrylate unit (mole %) | 2-Ethyl-hexyl acrylate unit (mole %) | Epoxy equivalent | Crease resistances (warp + filling) Dry | Crease resistances (warp + filling) Wet | Tensile strength (kg/5cm) | Redeposition (Aquadag method) |
|---|---|---|---|---|---|---|---|---|---|
| C-1 | about 5-10 | 1.4 | 0 | 98.6 | 13582 | 269 | 260 | 22.8 | Much spot-like soil observed |
| C-2 | 5-10 | 1.2 | 0.6 | 98.2 | 16754 | 272 | 262 | 23.0 | A slight soil remained as spots |
| C-3 | 3-5 | 6.2 | 8.6 | 85.2 | 4587 | 274 | 267 | 24.1 | Scarcely any soil observed |
| C-4 | 5-10 | 31.6 | 12.7 | 55.7 | 961 | 289 | 272 | 23.7 | Scarcely any soil observed |
| C-5 | 3-5 | 31.4 | 24.9 | 43.7 | 1346 | 290 | 263 | 23.1 | Soil removed completely |
| C-6 | less than 10 | 54.5 | 0.5 | 45 | 308 | 273 | 268 | 22.6 | Scarcely any soil observed |
| C-7 | 3-5 | 49.4 | 31.6 | 19.0 | 973 | 265 | 262 | 18.3 | Soil removed completely |
| C-8 | 5-10 | 60.2 | 14.8 | 38 | 541 | 261 | 258 | 19.7 | Scarcely any soil observed |

Table 2-continued

| Copolymer emulsion | Average molecular weight ($\times 10^4$) | Glycidyl methacrylate unit (mole %) | Methoxy-tricosa-ethylene glycol monomethacrylate unit (mole %) | 2-Ethyl-hexyl acrylate unit (mole %) | Epoxy equivalent | Crease resistances (warp + filling) Dry | Crease resistances (warp + filling) Wet | Tensile strength (kg/5cm) | Redeposition (Aquadag method) |
|---|---|---|---|---|---|---|---|---|---|
| C-9 | less than 0.3 | 31.4 | 24.9 | 43.7 | 1600 | 247 | 231 | 18.6 | Soil removed completely |
| C-10 | 0.7–1.5 | 31.4 | 24.9 | 43.7 | 1420 | 274 | 258 | 22.4 | Soil removed completely |
| Untreated | — | — | — | — | — | 165 | 163 | 31.5 | A slight soil remained as spots |

The following conclusion can be drawn from the results shown in Table 2. Fabrics treated by the method of this invention using copolymer emulsions C-2 to C-6 and C-10 showed a very good balance between dry and wet crease resistances and strength, and very little soil deposition at the time of washing (resistance to redeposition). On the other hand, the fabric treated with the treating liquor containing copolymer emulsion C-1 showed very good balance between crease resistances and strength, but had poor resistance to redeposition.

When copolymer emulsions C-7 to C-10 were used, resistance to redeposition was very much improved, but the strength was reduced greatly.

EXAMPLE 3

A plain-knitted cotton fabric scoured, bleached and mercerized in a customary manner was dipped in each of treating liquors I, II, IV and V, withdrawn from the treating bath, squeezed to a pickup of 75% based on the weight of the knitted fabric, and pre-dried by a cylindrical dryer under no tension. Then, the fabric was heat-treated at 180° C. for 1 minute while it was being tentered 15% in the filling direction. The properties of the fabric after treatment are shown in Table 3.

Table 3

| Properties Treating liquor | Shrinkage on washing Warp | Shrinkage on washing Filling | Tensile strength in the weft direction (kg/2.5 cm) | Surface abrasion strength (cycles) |
|---|---|---|---|---|
| Untreated | 9.3 | 13.5 | 17.2 | 70–75 |
| I | 3.5 | 6.8 | 18.8 | 150–155 |
| II | 3.2 | 6.4 | 20.5 | 165–170 |
| IV | 1.7 | 3.4 | 18.3 | 150 |
| V | 1.1 | 2.5 | 19.6 | 150–155 |

It can be seen from Table 3 that the knitted fabric treated by the process of the invention with treating liquors I, II, IV and V have markedly improved shrinkage on washing, tensile strength and surface abrasion strength over the non-treated fabric. These treated fabrics had superior resistance to redeposition, and ability to remove an oily soil (machine oil) and an aqueous soil (sauce) on washing.

EXAMPLE 4

A blend-woven fabric (65% Tetoron polyester/35% cotton) was treated with each of treating liquors IV and V, and post-treated in the same way as in Example 1. The dry crease resistances (warp + filling) of the treated fabrics were 308° and 315°, respectively. The fabric before treatment had a dry crease resistance of 250°. Soil redeposition on the treated fabrics was very much reduced.

EXAMPLE 5

A rayon woven fabric was treated with each of treating liquors IV and V, and post-treated in the same way as in Example 1. The wet crease resistance (warp + filling) of the treated fabrics were 250° and 265°, respectively. The fabric before treatment had a wet crease resistance of 163°. Soil redeposition on the treated fabrics was very much reduced.

EXAMPLE 6

A non-woven web of 100% rayon having a basis weight of 60 g/m$^2$ was placed on a wire gauze-type belt, dipped in treating liquor IX of the following formulation, squeezed to a pickup of 150% based on the weight of the web, predried at 120° C. for 4 minutes, and then heat-treated at 155° C. for 3.5 minutes.

The dry crease resistance (warp + filling) of the treated non-woven fabric was 310°.

The wash resistance of the fabric was examined by washing it at 40° C. for 15 minutes in a home washing machine using 0.2% of a household detergent (ZABU, a trademark for a product of Kao Soap Co., Ltd.). There was no change in shape, and the dry crease resistance (warp + filling) of the fabric after washing was 305°. No formaldehyde was detected in the treated web, and soil redeposition was very much reduced.

| Treating liquor IX | |
|---|---|
| 1,3-Dimethyl-4,5-dihydroxy-2-imidazolidinone (about 50% aqueous solution) | 15% by weight |
| Emulsion of copolymer A (solids content about 50%) | 60% by weight |
| Acid catalyst (a 12.5% aqueous solution of trifluoroacetic acid) | 2% by weight |
| Acid catalyst (a 25% aqueous solution of zinc chloride) | 1% by weight |
| Water | remainder |

EXAMPLE 7

A treating liquor was prepared in accordance with the same formulation as in treating liquor V in Example 1 except that 2.5% by weight of trifluoroacetic acid (12.5% aqueous solution) as an acid catalyst was changed to 0.5% by weight, and 1.5% by weight of a 25% aqueous solution of zinc chloride was further added. A cotton satin fabric was treated with the resulting treating liquor in the same way as in Example 1. The treated fabric and a dry crease resistance (warp + filling) of 293°, while the fabric before treatment had a dry crease resistance of 169°. Redeposition of soil onto the treated fabric was very much reduced.

EXAMPLE 8

Diammonium phosphate was further added to the treating liquor used in Example 7, and its pH was adjusted to 5.5. A cotton twill woven fabric dyed with a reactive dye was treated with this treating liquor in the same way as in Example 1. The treated fabric had a dry crease resistance (warp+filling) of 278°, while the fabric before treatment had a dry crease resistance of 175°. No discoloration was seen in the dyed color of the treated fabric.

EXAMPLE 9

A 40-count cotton poplin woven fabric was dipped in each of treating liquors X to XIII shown below, and post-treated in the same way as in Example 1. The properties of the fabric treated were measured, and the results are shown in Table 4.

| Treating liquor X (invention) | |
|---|---|
| Emulsion of copolymer D (solids content about 50%) | 10% by weight |
| Acid catalyst (main ingredient: magnesium chloride; ACCELERATOR X-80, a product of Sumitomo Chemical Co., Ltd.) | 2% by weight |
| Water | remainder |

| Treating liquor XI (invention) | |
|---|---|
| 4,5-Dihydroxy-2-imidazolidinone (about 20% aqueous solution) | 30% by weight |
| Emulsion of copolymer B (solids content about 50%) | 5% by weight |
| Acid catalyst (main ingredient: magnesium chloride; ACCELERATOR X-80, a product of Sumitomo Chemical Co., Ltd.) | 3.5% by weight |
| Water | remainder |

| Treating liquor XII (comparison 5) | |
|---|---|
| Emulsion of copolymer B (solids content about 50%) | 10% by weight |
| Acid catalyst (main ingredient: magnesium chloride; ACCELERATOR X-80, a product of Sumitomo Chemical Co., LTd.) | 2% by weight |
| Water | remainder |

| Treating liquor XIII (comparison 6) | |
|---|---|
| 4,5-Dihydroxy-2-imidazolidinone (about 20% aqueous solution) | 5% by weight |
| Acid catalyst (main ingredient: magnesium chloride; ACCELERATOR X-80) | 3.5% by weight |
| Water | remainder |

Emulsion of copolymer D used in preparing treating liquors X and XI was produced in accordance with the following recipe D by the same procedure as in the production of the emulsion of copolymer A.

| Recipe D | | |
|---|---|---|
| Methoxynonaethylene glycol monomethacrylate | 18 | parts by weight |
| Glycidyl methacrylate | 7 | |
| 2-Ethylhexyl acrylate | 20 | |
| Polyethylene alkyl phenol ether (NONION NS-230, a product of Nippon Oils and Fats Co., Ltd.) | 1.7 | |
| Polyoxyethylene alkyl phenol ether (EMULSIT 9, a product of Daiichi Kogyo Seiyaku Kabushiki Kaisha) | Kaisha) | |
| Polyethylene glycol lauryl ether (NOIGEN YX-500, a product of Daiichi Kogyo Seiyaku Kabushiki Kaisha) | 1.7 | |
| Polyoxyethylene lauryl ether sulfate ester, sodium salt (TRAX K-300, a product of Nippon Oils and Fats Co., Ltd.) | 1.3 | |
| Potassium persulfate | 0.1 | |
| Deionized water | 48.8 | |

The resulting copolymer had the following properties.

| | |
|---|---|
| Glycidyl methacrylate unit: | 25.4 mole% |
| Methoxynonaethylene glycol monomethacrylate unit: | 18.7 mole% |
| 2-Ethylhexyl acrylate unit: | 55.9 mole% |
| Amount of oxirane oxygen in the emulsion: | |
| Found: | 0.749% |
| Calculated: | 0.788% |
| Epoxy equivalency: | 962 |
| Average molecular weight: | about 50,000 to 100,000 |
| Glass transition temperature: | about −32° C. |

Table 4

| Properties Treating liquors | Crease resistance (warp + filling) | | Tear strength (g) | Flex abrasion strength (cycles) | Shrinkage on washing | |
|---|---|---|---|---|---|---|
| | Dry | Wet | | | Warp | Filling |
| Untreated | 165 | 163 | 520 | 1100 | 2.7 | 3.4 |
| X (Invention) | 233 | 235 | 600 | 1985 | 0.2 | 0.7 |
| XI (Invention) | 298 | 272 | 560 | 1970 | 0 | 0 |
| XII (Comparison 5) | 229 | 231 | 570 | 1940 | 0.3 | 0.9 |
| XIII (Comparison 6) | 286 | 267 | 550 | 1830 | 0 | 0.1 |

| Properties Treating liquors | Wash and wear (grade) | Water penetrability (seconds) | Soil removing ability (sauce) | Redeposition (Aquadag method) |
|---|---|---|---|---|
| Untreated | 1-1.5 | below 1 | Some soil remained | Some spot-like soil remained |
| X (Invention) | 3 | 2-3 | Soil completely removed | Scarcely any soil observed |
| XI (Invention) | 5 | 3-4 | Soil completely removed | Scarcely any soil observed |

| | | | | |
|---|---|---|---|---|
| XII (Comparison 5) | 2.5–3 | above 300 | Considerable soil remained | More spot-like soil than in the untreated fabric |
| XIII (Comparison 6) | 4.5–5 | above 300 | Considerable soil remained | More spot-like soil than in the untreated fabric |

The following conclusion can be drawn from the results shown in Table 4. The fabrics treated with treating liquors X and XI by the process of this invention showed a marked improvement in dry and wet crease resistances, wash and wear properties and shrinkage on washing over the untrested fabric, and had higher flex abrasion strength than the latter. On the other hand, the fabrics treated with treating liquors XII and XIII (comparisons) showed a marked improvement in crease resistances, wash and wear properties and strength characteristics over the non-treated fabric, but had considerably deteriorated water penetrability, soil removing ability and resistance to redeposition. Accordingly, fabrics treated by the method of this invention show a marked improvement in crease resistances, strength characteristics and shrinkage on washing, and had very good water penetrability, soil removing ability and resistance to redeposition.

Clothes were produced by using each of the fabrics treated with the above treating liquors, and subjected to a wearing test. The fabrics treated with the comparison treating liquors showed static charge buildup and issued a clicking sound when the clothes were worn or removed. On the other hand, the clothes made of the fabrics treated in accordance with the present invention showed no static buildup, and gave a wearing comfort inherent to cotton products.

It can thus be seen that the fabrics treated by the process of the invention have superior antistatic properties.

What we claim is:

1. A glycidyl-containing copolymer consisting essentially of
   (a) 1 to 55 mole% of at least one structural unit of the formula

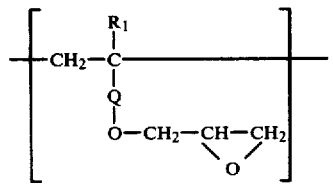

wherein $R_1$ represents a hydrogen atom or a methyl group, and Q is CO or $CH_2$, (b) 0.5 to 25 mole% of at least one structural unit of the formula

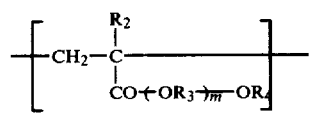

wherein $R_2$ represents a hydrogen atom or a methyl group, $R_3$ represents an alkylene group, $R_4$ represents a hydrogen atom, an alkyl group, an acryloyl group or a methacryloyl group, and m is an integer of 5 to 25, and (c) 98.5 to 20 mole% of at least one structural unit expressed by the formula

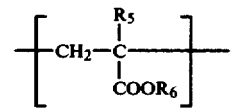

wherein $R_5$ represents a hydrogen atom or a methyl group, and $R_6$ represents an alkyl group or a hydroxyalkyl group.

2. The copolymer of claim 1 wherein said glycidyl-containing copolymer consists essentially of (a) 5 to 35 mole% of at least one structural unit of formula (I), (b) 2 to 20 mole% of at least one structural unit of formula (II), and (c) 93 to 45 mole% of at least one structural unit of formula (III).

3. The copolymer of claim 1 wherein said glycidyl-containing copolymer consists only of the structural units of formulas (I), (II) and (III).

4. The copolymer of claim 1 wherein said glycidyl-containing copolymer has a glass transition temperature of not more than 50° C.

5. The copolymer of claim 1 wherein said glycidyl-containing copolymer has an epoxy equivalency of 17,000 to 250.

6. The copolymer of claim 1 wherein said glycidyl-containing copolymer has a molecular weight of at least 7,000.

7. The copolymer of claim 1 wherein the structure of formula

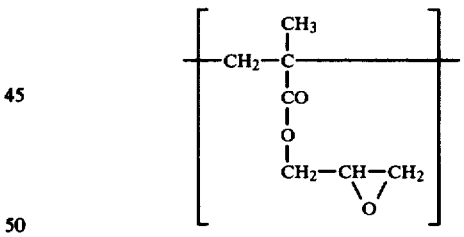

is used as the structural unit of formula (I).

8. The copolymer of claim 1 wherein the structure of the formula

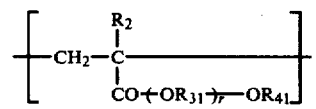

wherein $R_2$ represents a hydrogen atom or a methyl group, $R_{31}$ represents an alkylene group containing not more than 3 carbon atoms, $R_{41}$ represents alkyl group containing not more than 10 carbon atoms, and r is 9 to 23, is used as the structural unit of formula (II).

9. The copolymer of claim 1 wherein the structural unit of formula (III) has the following formula

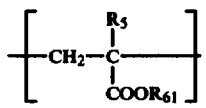

wherein $R_5$ represents a hydrogen atom or a methyl group, and $R_{61}$ represents an alkyl group containing up to 18 carbon atoms, or a hydroxyalkyl group containing up to 6 carbon atoms.

10. The copolymer of claim 1, wherein said glycidyl-containing copolymer consists essentially of (a) 10 to 25 mole% of at least one structural unit of formula (I), (b) 5 to 15 mole% of at least one structural unit of formula (II), and (c) 85 to 60 mole% of at least one structural unit of formula (III).

11. The copolymer of claim 1 wherein said glycidyl-containing copolymer has a glass transition temperature of not more than 30° C.

12. The copolymer of claim 1 wherein said glycidyl-containing copolymer has an epoxy equivalency of 5,000 to 400.

13. The copolymer of claim 1 wherein said glycidyl-containing copolymer has a molecular weight of at least 30,000.

14. The copolymer of claim 1 wherein the structure of the formula

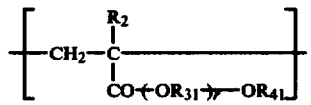

where $R_2$ represents a hydrogen atom or a methyl group, $R_{31}$ represents an alkylene group containing not more than three carbon atoms, $R_{41}$ represents alkyl group containing not more than 5 carbon atoms, and r is 9 to 23, is used as the structural unit of formula (II).

15. The copolymer of claim 1 wherein the structure of the formula

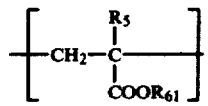

wherein $R_5$ represents a hydrogen atom or a methyl group and $R_{61}$ represents an alkyl group containing 1 to 9 carbon atoms, or a hydroxyalkyl group containing 2 to 4 carbon atoms, is used as the structural unit of formula (III).

16. The copolymer of claim 1 wherein the glycidyl-containing copolymer further includes structural units derived from another copolymerizable vinyl monomer in an amount up to 10 mole%.

17. The copolymer of claim 16 wherein the other copolymerizable vinyl monomer is selected from the group consisting of itaconic acid, crotonic acid, acrylamide, methacrylamide and acrylonitrile.

18. The copolymer of claim 1 wherein said glycidyl-containing copolymers has a glass transition temperature of from 0° to −70° C.

19. The copolymer of claim 1 wherein said glycidyl-containing copolymer has a molecular weight of at least 50,000.

20. The copolymer of claim 7 wherein the structure of the formula

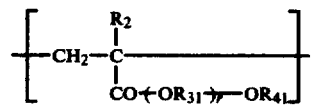

wherein $R_2$ represents a hydrogen atom or a methyl group, $R_{31}$ represents an alkylene group containing not more than 3 carbon atoms, $R_{41}$ represents an alkyl group containing not more than 10 carbon atoms, and r is 5 to 25, is used as the structural unit of formula (II), and the structure of the formula

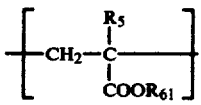

wherein $R_5$ represents a hydrogen atom or methyl group, and $R_{61}$ represents an alkyl group containing up to 18 carbon atoms or a hydroxyalkyl group containing up to 6 carbon atoms, is used as the structural unit of the formula (III).

* * * * *